(12) United States Patent
Nakayama

(10) Patent No.: US 11,705,977 B2
(45) Date of Patent: Jul. 18, 2023

(54) RADIO COMMUNICATION APPARATUS, RADIO WAVE CONTROL METHOD, AND STORAGE MEDIUM STORING RADIO WAVE CONTROL PROGRAM

(71) Applicant: NEC Corporation, Tokyo (JP)

(72) Inventor: Naoya Nakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 17/375,888

(22) Filed: Jul. 14, 2021

(65) Prior Publication Data
US 2022/0038195 A1 Feb. 3, 2022

(30) Foreign Application Priority Data
Jul. 28, 2020 (JP) .............................. JP2020-127128

(51) Int. Cl.
*H04B 17/391* (2015.01)
*H04B 17/364* (2015.01)
*H04W 72/044* (2023.01)
*H04B 17/327* (2015.01)
*H04B 17/10* (2015.01)

(52) U.S. Cl.
CPC ......... *H04B 17/364* (2015.01); *H04B 17/102* (2015.01); *H04B 17/327* (2015.01); *H04B 17/391* (2015.01); *H04W 72/0473* (2013.01)

(58) Field of Classification Search
CPC .. H04B 17/364; H04B 17/102; H04B 17/327; H04B 17/391; H04W 72/0473; H04W 52/245; H04W 52/246; H04W 52/262; H04W 52/283; G01S 13/08; G01S 17/08
See application file for complete search history.

(56) References Cited

U.S. PATENT DOCUMENTS

| | | | |
|---|---|---|---|
| 3,877,002 A * | 4/1975 | Cheal ................. | G08B 13/2491 340/552 |
| 6,188,678 B1 * | 2/2001 | Prescott .............. | H04W 52/221 370/335 |
| 2018/0097555 A1 * | 4/2018 | Nammi ............... | H03M 13/353 |
| 2019/0260406 A1 * | 8/2019 | Medbo ................ | H04B 17/318 |
| 2021/0400504 A1 * | 12/2021 | Makki .................... | H04W 24/04 |
| 2022/0038147 A1 * | 2/2022 | Nakamura ............... | H04B 7/08 |

FOREIGN PATENT DOCUMENTS

JP 2010-157944 A 7/2010

* cited by examiner

*Primary Examiner* — Edan Orgad
*Assistant Examiner* — Malick A Sohrab

(57) ABSTRACT

A radio communication apparatus according to an exemplary aspect includes: a detection unit configured to detect an object flying in the vicinity of a propagation path of directional radio waves; a distance calculation unit configured to calculate a distance between the propagation path of the radio waves and the object detected by the detection unit; a change amount determination unit configured to determine a change amount of a transmission power value used in performing transmission of the radio waves in accordance with the distance calculated by the distance calculation unit; and a signal control unit configured to control the transmission power value based on the change amount determined by the change amount determination unit. The change amount determination unit adopts a positive value as the change amount when the calculated distance is equal to or smaller than the prescribed distance.

5 Claims, 7 Drawing Sheets

| CONDITIONS | FIRST CHANGE AMOUNT | SECOND CHANGE AMOUNT | CHANGE AMOUNT OF TRANSMISSION POWER VALUE |
|---|---|---|---|
| CALCULATED DISTANCE IS EQUAL TO OR SMALLER THAN DISTANCE THRESHOLD VALUE & RECEPTION POWER VALUE IS EQUAL TO OR SMALLER THAN POWER THRESHOLD VALUE | +5dB | +1dB | +6dB |
| CALCULATED DISTANCE IS EQUAL TO OR SMALLER THAN DISTANCE THRESHOLD VALUE & RECEPTION POWER VALUE EXCEEDS POWER THRESHOLD VALUE | +5dB | -1dB | +5dB |
| CALCULATED DISTANCE EXCEEDS DISTANCE THRESHOLD VALUE & RECEPTION POWER VALUE IS EQUAL TO OR SMALLER THAN POWER THRESHOLD VALUE | 0dB | +1dB | +1dB |
| CALCULATED DISTANCE EXCEEDS DISTANCE THRESHOLD VALUE & RECEPTION POWER VALUE EXCEEDS POWER THRESHOLD VALUE | 0dB | -1dB | -1dB |

Fig. 4

| CONDITIONS | FIRST CHANGE AMOUNT | SECOND CHANGE AMOUNT | CHANGE AMOUNT OF TRANSMISSION POWER VALUE |
|---|---|---|---|
| CALCULATED DISTANCE IS EQUAL TO OR SMALLER THAN DISTANCE THRESHOLD VALUE & RECEPTION POWER VALUE IS EQUAL TO OR SMALLER THAN POWER THRESHOLD VALUE | +5dB | +1dB | +5dB |
| CALCULATED DISTANCE IS EQUAL TO OR SMALLER THAN DISTANCE THRESHOLD VALUE & RECEPTION POWER VALUE EXCEEDS POWER THRESHOLD VALUE | +5dB | −1dB | +4dB |
| CALCULATED DISTANCE EXCEEDS DISTANCE THRESHOLD VALUE & RECEPTION POWER VALUE IS EQUAL TO OR SMALLER THAN POWER THRESHOLD VALUE | 0dB | +1dB | +1dB |
| CALCULATED DISTANCE EXCEEDS DISTANCE THRESHOLD VALUE & RECEPTION POWER VALUE EXCEEDS POWER THRESHOLD VALUE | 0dB | −1dB | −1dB |

Fig. 7

RADIO COMMUNICATION APPARATUS, RADIO WAVE CONTROL METHOD, AND STORAGE MEDIUM STORING RADIO WAVE CONTROL PROGRAM

INCORPORATION BY REFERENCE

This application is based upon and claims the benefit of priority from Japanese patent application No. 2020-127128, filed on Jul. 28, 2020, the disclosure of which is incorporated herein in its entirety by reference.

TECHNICAL FIELD

The present disclosure relates to a radio communication apparatus for controlling radio waves, a radio wave control method, and a storage medium storing a radio wave control program.

BACKGROUND ART

Conventionally, various techniques for controlling radio waves have been proposed. As an example of these techniques, Japanese Unexamined Patent Application Publication No. 2010-157944 discloses a radio communication system in which the reception power of a plurality of signal waves and a delay variance are measured and a desirable communication path for the signal waves is selected based on the measured reception power and the delay variance.

However, the radio communication system disclosed in Japanese Unexamined Patent Application Publication No. 2010-157944 is a technique of switching a communication path that is cut off due to an obstacle to another communication path. Therefore, there is a problem that it is difficult to detect a flying object before the object enters the propagation path of the radio waves, leading to degradation in the radio wave communication quality due to the flying object entering the propagation path of the radio waves.

An object of the present disclosure is to provide, in view of the aforementioned problem, a radio communication apparatus, a radio wave control method, and a storage medium storing a radio wave control program, each of the apparatus, the method, and the program being configured to prevent degradation in the radio wave communication quality even when a flying object enters the propagation path of the radio waves.

SUMMARY

A radio communication apparatus according to an exemplary aspect of the present disclosure includes:

a detection unit configured to detect an object flying in the vicinity of a propagation path of directional radio waves;

a distance calculation unit configured to calculate a distance between the propagation path of the radio waves and the object detected by the detection unit;

a change amount determination unit configured to determine a change amount of a transmission signal quality index of the radio waves in accordance with the distance calculated by the distance calculation unit; and a signal control unit configured to control the transmission signal quality index based on the change amount determined by the change amount determination unit.

A radio wave control method according to an exemplary aspect of the present disclosure includes:

detecting an object flying in the vicinity of a propagation path of directional radio waves;

calculating a distance between the propagation path of the radio waves and the detected object;

determining a change amount of a transmission signal quality index of the radio waves in accordance with the calculated distance; and controlling the transmission signal quality index based on the determined change amount.

A non-transitory computer readable storage medium storing a radio wave control program according to an exemplary aspect of the present disclosure, the program causing a calculation apparatus included in a radio communication apparatus to execute the steps of:

calculating a distance between a propagation path of directional radio waves and a flying object in the vicinity of the propagation path;

determining a change amount of a transmission signal quality index of the radio waves in accordance with the calculated distance; and controlling the transmission signal quality index based on the determined change amount.

The transmission signal quality index includes at least one of a transmission power value which is a value used in transmitting the radio waves, a modulation system, and an error correction encoding system.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 4 is a diagram showing an example of a change amount determination rule according to the exemplary aspect of the present disclosure;

FIG. 7 is a diagram showing an example of a change amount determination rule according to another exemplary aspect of the present disclosure.

EMBODIMENTS

Figure 1:
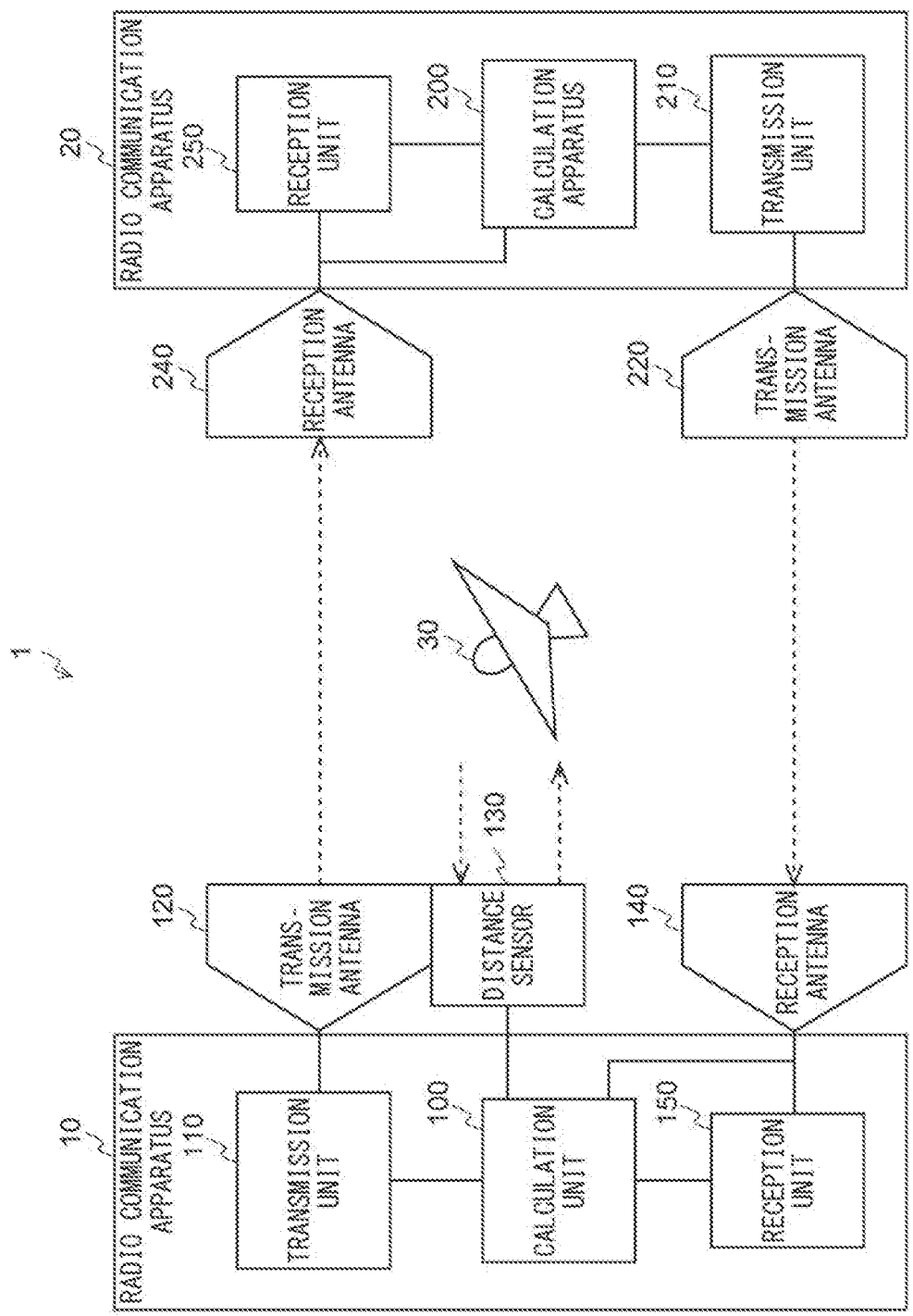
FIG. 1 is diagram showing a radio communication system according to an exemplary aspect of the present disclosure.

Hereinbelow, an exemplary aspect of the present disclosure will be described with reference to the drawings. FIG. 1 is a diagram showing a radio communication system 1 according to an exemplary aspect of the present disclosure. The radio communication system 1 includes a radio communication apparatus 10 and a radio communication apparatus 20. The radio communication apparatus 10 and the radio communication apparatus 20 communicate various information with each other using the radio waves.

The radio communication apparatus 10 includes a calculation apparatus 100, a transmission unit 110, a transmission antenna 120, a distance sensor 130, a reception antenna 140, and a reception unit 150. The radio communication apparatus 20 includes a calculation apparatus 200, a transmission unit 210, a transmission antenna 220, a reception antenna 240, and a reception unit 250. The configuration of the radio communication apparatus 20 is the same as that of the radio communication apparatus 10 and thus explanation thereof is omitted.

The transmission unit 110 is an apparatus that modulates information that is to be transmitted using a prescribed modulation system and provides the modulated information to the transmission antenna 120. Further, the transmission unit 110 encodes the information that is to be transmitted using a prescribed error correction encoding system, modulates the encoded information, and provides the encoded information to the transmission antenna 120.

The transmission antenna 120 converts the modulated information provided by the transmission unit 110 into the radio waves using power controlled by the calculation apparatus 100 and transmits the radio waves to the reception antenna 240 of the radio communication apparatus 20 with which the radio communication apparatus 10 performs radio communication. The transmission antenna 120 transmits the directional radio waves.

The distance sensor 130 is an apparatus that calculates a distance between itself and a flying object 30 (e.g. a bird, a drone, or the like) in the vicinity of the propagation path of the radio waves transmitted from the transmission antenna 120 using ranging waves such as an infrared light and millimeter waves. The distance sensor 130 includes a transmission device such an infrared light emitting element and a reception device such as an infrared light receiving element. The distance sensor 130 can calculate a distance between itself and a flying object in the vicinity of the propagation path of the radio waves based on a time difference between the time at which the ranging waves were transmitted and the time at which the ranging waves reflected back from the object and the speed of the ranging waves. When the reception device of the distance sensor 130 receives the reflected ranging waves, the distance sensor 130 calculates the distance between itself and the flying object in the vicinity of the propagation path of the radio waves and provides the distance information indicating the calculated distance to the calculation apparatus 100. In order to realize omnidirectional detection of the object approaching the propagation path of the radio waves, it is desirable to install a plurality of distance sensors 130 at a plurality of positions in the periphery of the transmission antenna 120.

The reception antenna 140 receives the radio waves transmitted from the radio communication apparatus 20 with which the radio communication apparatus 10 performs radio communication. When the reception antenna 140 receives the radio waves, the reception antenna 140 provides the received radio wave signal to the calculation apparatus 100 and the reception unit 150.

The reception unit 150 is an apparatus that demodulates the radio wave signal received from the reception antenna 140 and provides the demodulated information to the calculation apparatus 100. Further, when the demodulated information is encoded, the reception unit 150 can decode the demodulated information that has been encoded.

Figure 2:
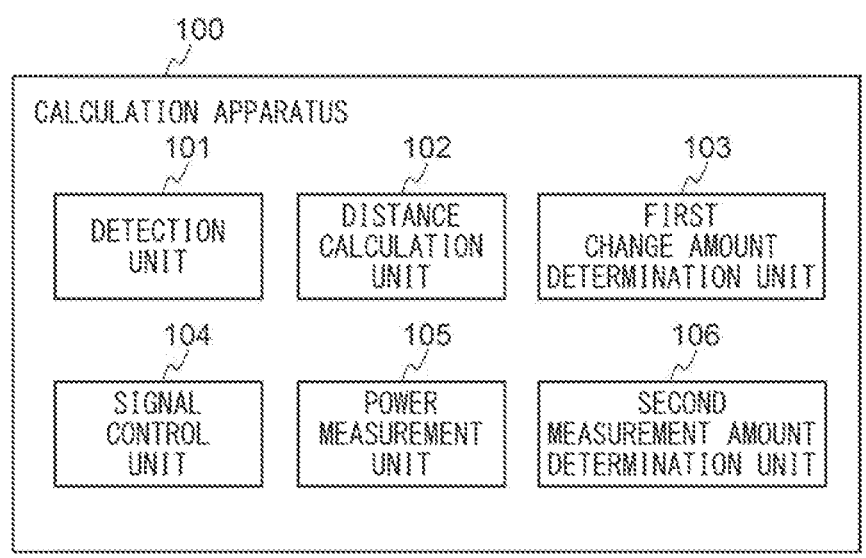
FIG. 2 is a block diagram showing a function of a calculation apparatus included in a radio communication apparatus according to the exemplary aspect of the present disclosure.

FIG. 2 is a block diagram showing a function of the calculation apparatus 100. The calculation apparatus 100 is an apparatus that controls the transmission unit 110, the transmission antenna 120, and other devices and circuits included in the radio communication apparatus 10. Specific examples of the calculation apparatus 100 includes a CPU (Central Processing Unit) and an MPU (Micro Processing Unit). The calculation apparatus 100 implements the radio wave control method by executing a radio wave control program stored in a storage device (not shown) included in the radio communication apparatus 10. The radio wave control program includes a detection unit 101, a distance calculation unit 102, a first change amount determination unit 103, a signal control unit 104, a power measurement unit 105, and a second change amount determination unit 106. Note that the functions of the program may be realized by an integrated circuit such as FPGA (Field-Programmable Gate Array), ASIC (Application Specific Integrated Circuit), or the like.

The detection unit 101 is a program for deciding presence or absence of a flying object in the vicinity of the propagation path of the radio waves transmitted from the transmission antenna 120. As described above, the distance sensor 130 provides the distance information to the calculation apparatus 100 only when the distance sensor 130 has received the reflected ranging waves. Therefore, the detection unit 101 can decide the presence or the absence of the flying object in the vicinity of the propagation path of the radio waves by deciding whether or not the detection unit 101 has received the distance information from the distance sensor 130.

The distance calculation unit 102 is a program for calculating a distance between the propagation path of the radio waves and the flying object in the vicinity of the propagation path of the radio waves. Specifically, the distance calculation unit 102 can specify a three-dimensional spatial position of the flying object based on the position of the plurality of the distance sensors 130 and the distance between each distance sensor 130 and the object indicated by the distance information provided from each distance sensor 130. Then, the distance calculation unit 102 can calculate the distance between the propagation path of the radio waves and the object based on the known three-dimensional spatial position of the propagation path of the radio waves and the position of the specified object. The distance between the propagation path of the radio waves and the object may be, for instance, a distance between the profile of a first Fresnel zone of the propagation path of the radio waves and the object.

The first change amount determination unit 103 is a program for determining a change amount of a transmission signal quality index used in the transmission of the radio waves from the transmission antenna 120 in accordance with the distance calculated by the distance calculation unit 102. The transmission signal quality index includes a transmission power value which is a power value used in the transmission of the radio waves from the transmission antenna 120, the modulation system, and the error correction encoding system. In the present example embodiment, the transmission power value is adopted as the transmission signal quality index. The first change amount determination unit 103 adopts a positive value as the first change amount when the distance calculated by the distance calculation unit 102 is equal to or smaller than a default threshold value (hereinbelow referred to as a "distance threshold value"). On the other hand, when the distance calculated by the distance calculation unit 102 exceeds the distance threshold value, the first change amount can be zero.

The distance threshold value can be a distance at which there is a possibility for the flying object to enter the propagation path. For instance, when the distance between the profile of the first Fresnel zone of the propagation path of the radio waves and the object is adopted as the distance between the propagation path of the radio waves and the object, the distance threshold value can be, for instance, 0.5 m or the like. The distance threshold value may be determined based on the maximum value of the moving speed of the flying object that may possibly fly, the range that can be measured by the distance sensor 130, and the processing time taken from the detection of the object by the distance sensor 130 up to the change of the transmission power value by the radio communication apparatus 10.

The first change amount is a change amount determined in accordance with the presence or the absence of an object in the vicinity of the propagation path of the radio waves. The positive value adopted as the first change amount can be a value that does not degrade the radio wave communication quality even when the object enters the propagation path of the radio waves, for instance, +5 dB or the like. Note that it is desirable to determine this value in consideration of the influence of radio waves on the radio communication apparatus present in the vicinity of the propagation path of the radio waves.

The signal control unit 104 is a program for controlling the transmission signal quality index based on the change amount determined by the first change amount determination unit 103. In the present example embodiment, the signal control unit 104 controls the transmission power value based on the change amount determined by the first change amount determination unit 103. That is, the signal control unit 104 corresponds to a power control unit that controls the transmission power value. Specifically, the signal control unit 104 can control the transmission power value by adding the prescribed power value to the change amount determined by the first change amount determination unit 103. It is desirable that the prescribed power value be a value at which the radio communication apparatus serving as the receiving side can accurately demodulate the modulated waves in consideration of the attenuation of the radio waves.

The power measurement unit 105 is a program for measuring a power value of the radio wave signal received from the reception antenna 140.

The second change amount determination unit 106 is a program for determining the change amount of the transmission power value of the radio communication apparatus 10 in accordance with the power value of the radio wave signal measured by the power measurement unit 105. The second change amount determination unit 106 generates power control information designating a positive value as the second change amount when the power value of the radio wave signal is equal to or smaller than the prescribed threshold value (hereinbelow referred to as a "power threshold value"). It is desirable that the power threshold value be a value at which the radio communication apparatus serving as the receiving side can accurately demodulate the modulated waves. The power threshold value can be, for instance, −60 dBm or the like.

The second change amount is a change amount determined in accordance with the power value of the signal at the time the radio waves are received (hereinbelow referred to as a "reception power value"). The positive value adopted as the second change amount can be a value that does not degrade the radio wave communication quality even in meteorological conditions such as rainfall, snowfall, or the like, for instance, +1 dB or the like. Note that it is desirable to determine this value in consideration of the influence of radio waves on the radio communication apparatus present in the vicinity of the propagation path of the radio waves into consideration.

On the other hand, the second change amount determination unit 106 generates power control information designating a negative value as the second change amount when the power value of the radio wave signal exceeds the power threshold value. The negative value adopted as the second change amount can be, for instance, −1 dB or the like. Note that zero may be adopted as the second change amount.

The first change amount determination unit 103 determines, in accordance with the prescribed change amount determination rule, the change amount of the transmission power value based on the first change amount determined by the first change amount determination unit 103 and the second change amount of the radio communication apparatus 20 with which the radio communication apparatus 10 performs radio communication determined by the second change amount determination unit 106.

Specifically, when the distance calculated by the distance calculation unit 102 is equal to or smaller than the distance threshold value and the reception power value is equal to or smaller than the power threshold value, the first change amount determination unit 103 can determine the addition value (i.e., the sum) of the first change amount and the second change amount as the change amount of the transmission power value. For instance, when the change amount determination rule shown in FIG. 4 is adopted, the first change amount determination unit 103 can determine the addition value (+6 dB) of the first change amount (+5 dB) and the second change amount (+1 dB) as the change amount of the transmission power value.

Further, when the distance calculated by the distance calculation unit 102 is equal to or smaller than the distance threshold value and the reception power value exceeds the power threshold value, the first change amount determination unit 103 can determine the first change amount as the change amount of the transmission power value. For instance, when the change amount determination rule shown in FIG. 4 is adopted, the first change amount determination unit 103 can determine the first change amount (+5 dB) as the change amount of the transmission power value.

Figure 3:
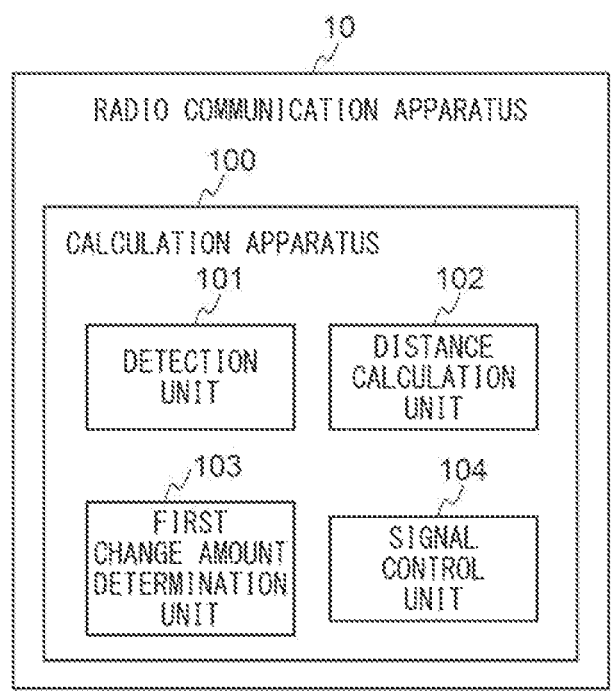
FIG. 3 is a block diagram showing main structural components of the radio communication apparatus according to the exemplary aspect of the present disclosure.

FIG. 3 is a block diagram showing main structural components of the radio communication apparatus 10. The radio communication apparatus 10 includes the detection unit 101, the distance calculation unit 102, the first change amount determination unit 103, and the signal control unit 104.

Figure 5:
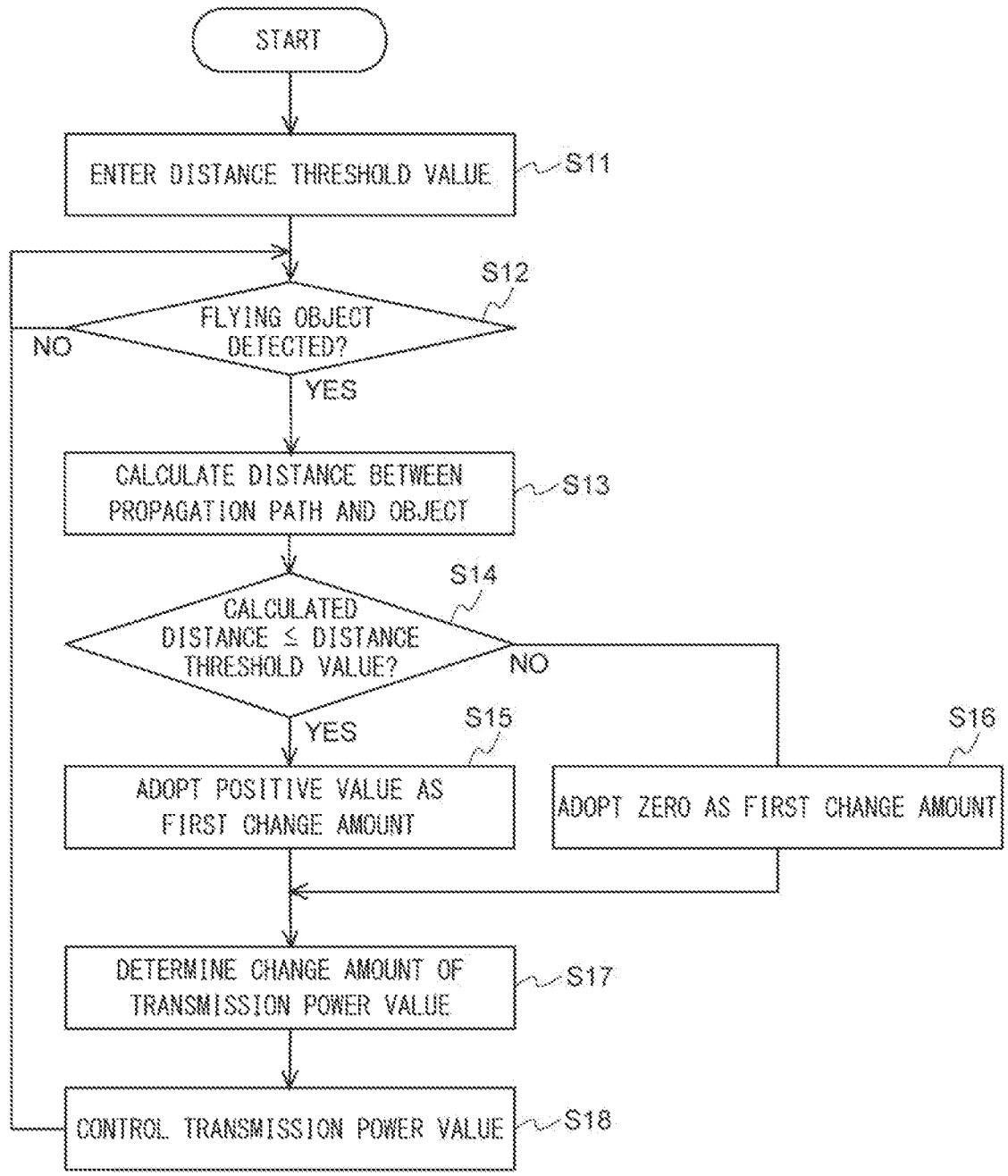
FIG. 5 is a flowchart showing an example of processing performed by the radio communication apparatus according to the exemplary aspect of the present disclosure.

FIG. 5 is a flowchart showing an example of processing performed by each of the radio communication apparatus 10 and the radio communication apparatus 20. Hereinbelow, a case where the processing shown in FIG. 5 is performed by the radio communication apparatus 10 will be described.

In Step S11, the distance threshold value is entered into the radio communication apparatus 10 by an administrator of the radio communication system 1. In Step S12, the detection unit 101 determines whether or not the flying object is present in the vicinity of the propagation path of the radio waves. When the flying object is not detected (NO), the processing of Step S12 is repeated. On the other hand, when the flying object is detected (YES), the distance calculation unit 102 calculates the distance between the propagation path of the radio waves and the object in Step S13.

In Step S14, the first change amount determination unit 103 determines whether or not the distance calculated by the distance calculation unit 102 is equal to or smaller than the distance threshold value. When the calculated distance is equal to or smaller than the distance threshold value (YES), the first change amount determination unit 103 adopts a positive value as the first change amount in Step S15. On the other hand, when the calculated distance exceeds the distance threshold value (NO), the first change amount determination unit 103 adopts zero as the first change amount in Step S16.

In Step S17, the first change amount determination unit 103 determines the transmission power value based on the first change amount and the second change amount indicated in the power control information provided by the radio communication apparatus 20 with which the radio communication apparatus 10 performs radio communication in accordance with the prescribed change amount determination rule. In Step S18, the signal control unit 104 sets the value determined by the first change amount determination unit 103 as the transmission power value and the processing returns to Step S12.

Figure 6:
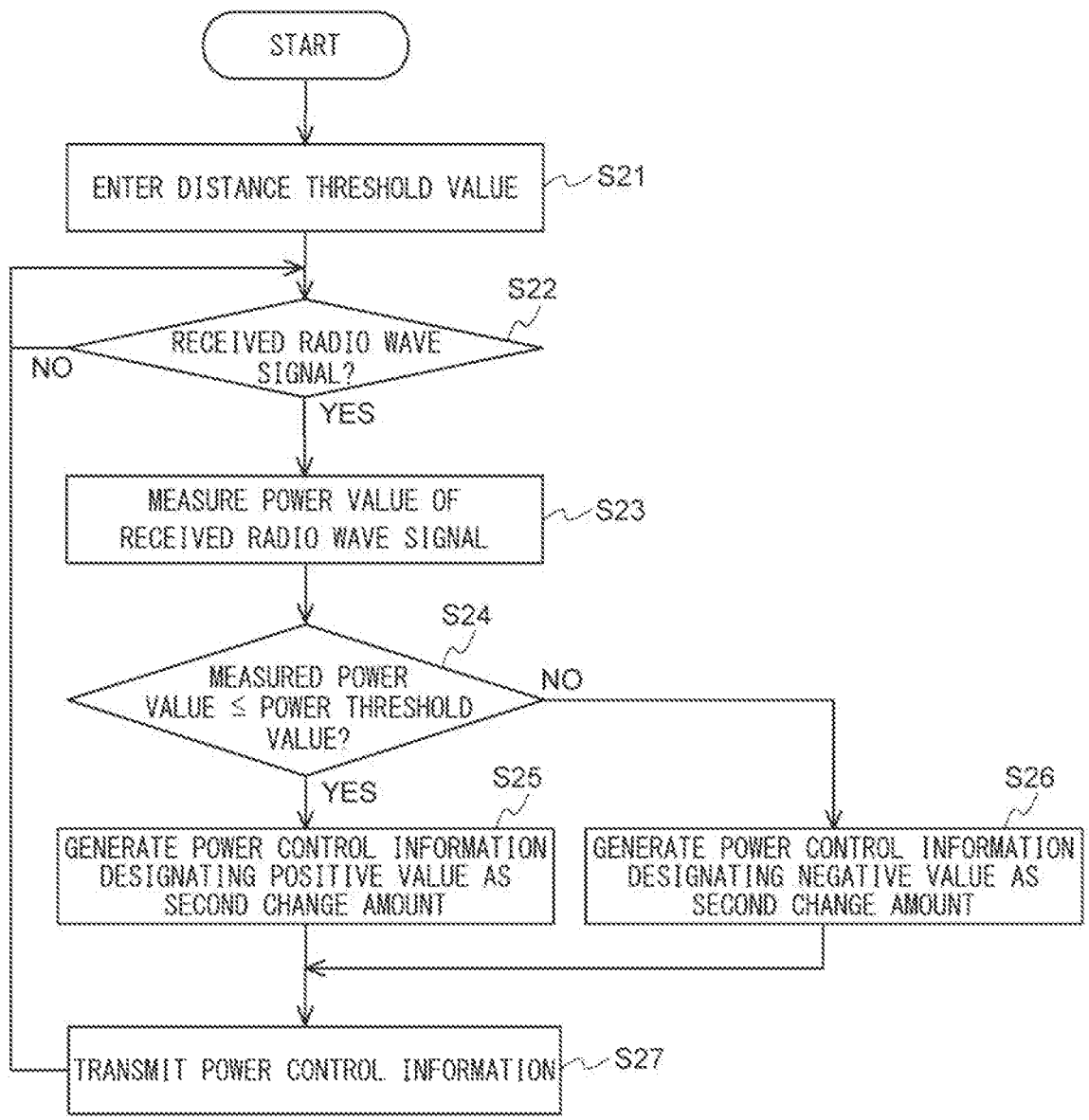
FIG. 6 is a flowchart showing an example of processing performed by the radio communication apparatus according to the exemplary aspect of the present disclosure.

FIG. 6 is a flowchart showing an example of processing performed by each of the radio communication apparatus 10 and the radio communication apparatus 20. Hereinbelow, a case where the processing shown in FIG. 6 is performed by the radio communication apparatus 20 will be described.

In Step S21, the power threshold value is entered into the radio communication apparatus 20 by an administrator of the radio communication system 1. In Step S22, the power measurement unit 105 determines whether or not the radio wave signal has been received from the reception antenna 140. When the radio signal has not been received from the reception antenna 140 (NO), the processing of Step S22 is repeated. On the other hand, when the radio wave signal is received from the reception antenna 140 (YES), the power measurement unit 105 measures the power value of the radio wave signal in Step S23.

In Step S24, the second change amount determination unit 106 determines whether or not the power value measured by the power measurement unit 105 is equal to or smaller than the power threshold value. When the measured power value is equal to or smaller than the power threshold value (YES), the second change amount determination unit 106 generates power control information designating a positive value as the second change amount in Step S25. On the other hand, when the measured power value exceeds the power threshold value (NO), the second change amount determination unit 106 generates power control information designating a negative value as the second change amount in Step S26. In Step S27, the transmission unit 110 modulates the power control information generated by the second change amount determination unit 106 and transmits the modulated power control information to the radio communication apparatus 10 via the transmission antenna 120. Then, the processing of Step S22 is repeated.

In the example embodiment described above, the detection unit 101 detects a flying object in the vicinity of the propagation path of the directional radio waves. Next, the distance calculation unit 102 calculates the distance between the propagation path of the radio waves and the object detected by the detection unit 101. Then, the first change amount determination unit 103 determines the change amount of the transmission power value in accordance with the distance calculated by the distance calculation unit 102. The first change amount determination unit 103 adopts a positive value as the change amount when the calculated distance is equal to or smaller than the distance threshold value. The signal control unit 104 control the transmission power value based on the change amount determined by the first change amount determination unit 103.

With such configuration, when an object comes flying in the vicinity of the propagation path of the radio waves, it is possible to increase the transmission power value to thereby increase the intensity of the radio waves before the object enters the propagation path. Therefore, it is possible to prevent degradation in the radio wave communication quality even when an object enters the propagation path. This is an advantageous effect that is achieved compared to a method of detecting entry of an object in the propagation path of the radio waves based on the decrease in the power value of the received radio signal.

Further, the first change amount determination unit 103 determines the change amount of the transmission power value based on the first change amount and the second change amount determined in accordance with the reception power value. The second change amount is a positive value when the reception power value is equal to or smaller than the power threshold value. When the distance calculated by the distance calculation unit 102 is equal to or smaller than the distance threshold value and the reception power value is equal to or smaller than the power threshold value, the first change amount determination unit 103 determines the addition value of the first change amount and the second change amount as the change amount of the transmission power value.

In the meteorological conditions such rainfall, snowfall, or the like, there is a possibility of decrease in the reception power value leading to degradation in the radio wave communication quality. In such case, when an object enters the propagation path of the radio waves, the radio wave communication quality may be significantly degraded. In the example embodiment described above, when an object comes flying in the vicinity of the propagation path of the radio waves in the meteorological conditions such as rainfall, snowfall, or the like, it is possible to further increase the transmission power value to thereby increase the intensity of the radio waves and degradation of the radio wave communication quality can be prevented.

Further, the second change amount can take a negative value when the reception power value exceeds the power threshold value. When the distance calculated by the distance calculation unit 102 is equal to or smaller than the distance threshold value and the reception power value exceeds the power threshold value, the first change amount determination unit 103 determines the first change amount as the change amount of the transmission power value. That is, when none of the meteorological conditions such as rainfall, snowfall, or the like is occurring, the first change amount determination unit 103 does not adopt the addition value of the first change amount and the second change amount as the transmission power value but instead adopts the first change amount as the change amount of the transmission power value. Therefore, sharp rise in the transmission power value can be suppressed whereby influence of radio waves on the radio communication apparatus present in the vicinity of the propagation path can be suppressed.

Other Example Embodiments

In other example embodiments, when the distance calculated by the distance calculation unit 102 is equal to or smaller than the distance threshold value and the reception power value is equal to or smaller than the power threshold value, the first change amount determination unit 103 determines the second change amount as the change amount of the transmission power value. For instance, when the change amount determination rule shown in FIG. 7 is adopted, the first change amount determination unit 103 can determine the second change amount (+5d B) as the change amount of the transmission power value.

By this configuration, when the reception power value is equal to or smaller than the power threshold value, that is, in the meteorological conditions such as rainfall, snowfall, or the like, when an object approaches the vicinity of the propagation path of the radio waves, instead of the addition value of the first change amount and the second change amount being adopted as the change amount of the transmission power value, the second change amount is adopted as the change amount of the transmission power value. When the reception power value is equal to or smaller than the power threshold value, since the first change amount is a positive value, the second change amount is a value that is smaller than the addition value of the first change amount and the second change amount. Therefore, when the above-mentioned meteorological conditions are occurring, it is possible to slow the increase of the transmission power value. As a result, it is possible to suppress the influence on of radio waves the radio communication apparatus present in the vicinity of the propagation path.

Further, in other example embodiments, when the distance calculated by the distance calculation unit 102 is equal to or smaller than the distance threshold value and the reception power value exceeds the power threshold value, the first change amount determination unit 103 determines the addition value of the first change amount and the second change amount as the change amount of the transmission power value. For instance, when the change amount determination rule shown in FIG. 7 is adopted, the first change amount determination unit 103 can determine the addition value (+4 dB) of the first change amount (+5 dB) and the second change amount (−1 dB) as the change amount of the transmission power value.

By this configuration, when the reception power value exceeds the power threshold value, that is, in the meteorological conditions such as rainfall, snowfall, or the like, instead of the second change amount being adopted as the change amount of the transmission power value, the addition value of the first change amount and the second change amount is adopted as the change amount of the transmission power value. When the reception power value exceeds the power threshold value, since the second change amount is a negative value, the addition value of the first change amount and the second change amount is a value that is smaller than the second change amount. Therefore, it is possible to slow the increase of the transmission power value when none of the above-mentioned meteorological conditions are occurring. As a result, it is possible to suppress the influence of radio waves on the radio communication apparatus present in the vicinity of the propagation path.

In the example embodiment described above, the distance sensor 130 is installed in the periphery of the transmission antenna 120. However, in other example embodiments, a plurality of the distance sensors 130 may be installed at a plurality of positions in the periphery of the reception antenna 140. In such case, the processing shown in each of FIGS. 5 and 6 may be performed by the same radio communication apparatus. Then, the radio communication apparatus transmits the change amount of the transmission power value determined as a result of performing the processing shown in each of FIGS. 5 and 6 to a radio communication apparatus (i.e. the communication partner) with which the aforementioned radio communication apparatus performs radio communication. The radio communication apparatus serving as the communication partner in radio communication controls the transmission power value based on the change amount of the determined transmission power value and controls the intensity of the radio waves transmitted from the transmission antenna 120. By this configuration, it is possible to control the intensity of the radio waves transmitted by the radio communication apparatus serving as the communication partner in radio communication in accordance with the distance between the flying object present in the propagation path of the radio waves in the vicinity of the reception antenna 140 and the propagation path.

Further, in the other example embodiments, a plurality of the distance sensors 130 may be installed at a plurality of positions in the periphery of the transmission antenna 120 and the reception antenna 140.

Further, in the other example embodiments, when the detection unit 101 determines that there is a flying object present in the propagation path of the radio waves, the signal control unit 104 may change the modulation system for modulating the information that is to be transmitted to a prescribed modulation system. The prescribed modulation system is a modulation system in which the reception power value of the radio waves required for performing demodulation therein is lower compared to the reception power value of the radio waves required for performing demodulation in the currently used modulation system. Specifically, when the distance calculated by the distance calculation unit 102 is equal to or smaller than the distance threshold value and the reception power value is equal to or smaller than the power threshold value, the signal control unit 104 changes the currently used modulation system to the prescribed modulation system. By this configuration, it is possible to maintain the radio wave communication quality without changing the transmission power value even when a flying object enters the propagation path of the radio waves.

Further, in other example embodiments, when the detection unit 101 determines that there is a flying object present in the propagation path of the radio waves, the signal control unit 104 may, in addition to changing the transmission power value, change the modulation system to a prescribed modulation system. The prescribed modulation system is a modulation system in which the reception power value of the radio waves required for performing demodulation therein is lower compared to the reception power value of the radio waves required for performing demodulation in the currently used modulation system. Specifically, when the distance calculated by the distance calculation unit 102 is equal to or smaller than the distance threshold value and the reception power value is equal to or smaller than the power threshold value, the signal control unit 104 changes the currently used modulation system to the prescribed modulation system. By this configuration, it is possible to maintain the radio wave communication quality while suppressing an increase in the transmission power value.

Further, in other example embodiments, when the detection unit 101 determines that there is a flying object present in the propagation path of the radio waves, the signal control unit 104 may change the error correction encoding system for encoding the information that is to be transmitted to a prescribed error correction encoding system. The prescribed error correction encoding system is an error correction encoding system in which the reception power value of the radio waves required for performing decoding in the prescribed error correction encoding system is lower compared to the reception power value of the radio waves required for performing decoding in the currently used error correction encoding system.

Specifically, when the distance calculated by the distance calculation unit 102 is equal to or smaller than the distance threshold value and the reception power value is equal to or smaller than the power threshold value, the signal control unit 104 changes the current error correction encoding system to the prescribed error correction encoding system. By this configuration, it is possible to maintain the radio wave communication quality without changing the transmission power value even when a flying object enters the propagation path of the radio waves.

Further, in other example embodiments, when the detection unit 101 determines that there is a flying object present in the propagation path of the radio waves, the signal control unit 104 may, in addition to changing the transmission power value, change the error correction encoding system to the prescribed error correction encoding system. The prescribed error correction encoding system is an error correction encoding system in which the reception power value of the radio waves required for performing decoding in the prescribed error correction encoding system is lower compared to the reception power value of the radio waves required for performing decoding in the currently used error correction encoding system. Specifically, when the distance calculated by the distance calculation unit 102 is equal to or smaller than the distance threshold value and the reception power value is equal to or smaller than the power threshold value, the signal control unit 104 changes the current error correction encoding system to the prescribed error correction encoding system. By this configuration, it is possible to maintain the radio wave communication quality while suppressing an increase in the transmission power value.

Further, in other example embodiments, the flying object present in the vicinity of the propagation path of the radio waves may be detected by detecting the far infrared ray emitted by the flying object. Further, in other example embodiments, the position of the flying object may be specified using an image capturing apparatus that can capture an image of a space where the propagation path of the radio waves exists as well as the distance sensor 130.

In the aforementioned example embodiments, the program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The present disclosure is not limited to the example embodiments described above and can be modified as appropriate without departing from the gist of the present disclosure.

According to the present disclosure, it is possible to provide a radio communication apparatus, a radio wave control method, and a non-transitory storage medium storing a radio wave control program, each of the apparatus, the method, and the program being configured to prevent degradation in the radio wave communication quality even when a flying object enters the propagation path of the radio waves.

The example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A radio communication apparatus comprising:
one or more processors; and
one or more memories storing instructions, wherein the one or more processors are configured to execute the instructions to:
detect an object flying in a vicinity of a propagation path of directional radio waves;
calculate a distance between the propagation path of the directional radio waves and the detected object detected by the detection unit;
determine a first change amount of a transmission power value of the directional radio waves in accordance with the calculated distance, wherein the first change amount is determined as a positive value when the calculated distance is equal to or less than a prescribed distance;
determine a second change amount of the transmission power value in accordance with a reception power value of a signal when the directional radio waves are received, wherein the second change amount is determined as a positive value when the reception power value is equal to or less than a prescribed threshold value;
set a control change amount to a sum of the first change amount and the second change amount when the calculated distance is equal to or less than the prescribed distance and the reception power value is equal to or less than the prescribed threshold value; and
control the transmission power value that is used to transmit the directional radio waves in accordance with the control change amount that has been set.

2. The radio communication apparatus according to claim 1, wherein
the second change amount is determined as a negative value when the reception power value is greater than the prescribed threshold value, and
the control change amount is set to the first change amount when the calculated distance is equal to or less than the prescribed distance and the reception power value is greater than the prescribed threshold value.

3. A radio communication apparatus comprising:
one or more processors; and
one or more memories storing instructions, wherein the one or more processors are configured to execute the instructions to:
detect an object flying in a vicinity of a propagation path of directional radio waves;
calculate a distance between the propagation path of the directional radio waves and the detected object;
determine a first change amount of a transmission power value of the directional radio waves in accordance with the calculated distance, wherein the first change amount is determined as a positive value when the calculated distance is equal to or less than a prescribed distance;
determine a second change amount of the transmission power value in accordance with a reception power value of a signal when the directional radio waves are received, wherein the second change amount is determined as a positive value when the reception power value is equal to or less than a prescribed threshold value;

set a control change amount based on the first change amount and the second change amount, wherein the control change amount is set to the second change amount when the calculated distance is equal to or less than the prescribed distance and the reception power value is equal to or less than the prescribed threshold value; and control the transmission power value that is used to transmit the directional radio waves in accordance with the control change amount that has been set.

4. The radio communication apparatus according to claim 3, wherein the second change amount is determined as a negative value when the reception power value is greater than the prescribed threshold value, and the control change amount is set to a sum of the first change amount and the second change amount when the calculated distance is equal to or less than the prescribed distance and the reception power value is greater than the prescribed threshold value.

5. A radio wave control method comprising:

detecting an object flying in a vicinity of a propagation path of directional radio waves;

calculating a distance between the propagation path of the directional radio waves and the detected object;

determining a first change amount of a transmission signal power value of the directional radio waves in accordance with the calculated distance, wherein the first change amount is determined as a positive value when the calculated distance is equal to or less than a prescribed distance;

determining a second change amount of the transmission power value in accordance with a reception power value of a signal when the directional radio waves are received, wherein the second change amount is determined as a positive value when the reception power value is equal to or less than a prescribed threshold value;

setting a control change amount to a sum of the first change amount and the second change amount when the calculated distance is equal to or less than the prescribed distance and the reception power value is equal to or less than the prescribed threshold value;

controlling the transmission power value that is used to transmit the directional radio waves in accordance with the control change amount that has been set.

* * * * *